US012369770B2

(12) United States Patent
Patel et al.

(10) Patent No.: US 12,369,770 B2
(45) Date of Patent: Jul. 29, 2025

(54) MULTI-CHANNEL VALVE FOR A DISHWASHING APPLIANCE

(71) Applicant: Haier US Appliance Solutions, Inc., Wilmington, DE (US)

(72) Inventors: Ravi Patel, Louisville, KY (US); Reagan Murphy, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/360,436

(22) Filed: Jul. 27, 2023

(65) Prior Publication Data

US 2025/0035221 A1 Jan. 30, 2025

(51) Int. Cl.
  *A47L 15/44* (2006.01)
  *A47L 15/00* (2006.01)
  *F16K 11/076* (2006.01)

(52) U.S. Cl.
  CPC ....... *A47L 15/4418* (2013.01); *A47L 15/0002* (2013.01); *A47L 15/449* (2013.01); *F16K 11/076* (2013.01)

(58) Field of Classification Search
  None
  See application file for complete search history.

(56) References Cited

U.S. PATENT DOCUMENTS

| 4,798,228 A | * | 1/1989 | Gollinger | ................ | B41F 31/08 101/425 |
| 7,837,771 B2 | | 11/2010 | Barone | | |
| 8,794,748 B2 | | 8/2014 | Borra et al. | | |
| 10,036,477 B2 | | 7/2018 | Gur | | |
| 11,566,365 B2 | | 1/2023 | Chae et al. | | |
| 2014/0060579 A1 | * | 3/2014 | Slabbekoorn | ....... | A47L 15/0021 134/10 |

FOREIGN PATENT DOCUMENTS

| AU | 2020210309 B2 | | 3/2022 |
| CN | 103290657 B | | 3/2016 |
| CN | 111962265 | * | 11/2020 |
| EP | 4183912 | * | 5/2023 |
| KR | 20100088314 A | | 8/2010 |
| WO | WO2022017128 A1 | | 1/2022 |

OTHER PUBLICATIONS

Translation of CN111962265 by Huang, published Nov. 20, 2020.*
Translation of EP4183912 by Hagleitner, published May 24, 2023.*

* cited by examiner

*Primary Examiner* — Michael E Barr
*Assistant Examiner* — Ryan L Coleman
(74) *Attorney, Agent, or Firm* — Dority & Manning, P.A.

(57) ABSTRACT

A multi-channel valve for a dishwashing appliance may define an axial direction, a radial direction, and a circumferential direction. The multi-channel valve may include a cylindrical housing that may include a plurality of inlet nozzles and a plurality of outlet nozzles. The multi-channel valve also may include an inner cylinder positioned within the cylindrical housing. The inner cylinder may define a central axis approximately parallel to the axial direction. The inner cylinder may include a plurality of flow channels each extended through the inner cylinder approximately perpendicular to the central axis. The plurality of flow channels may be spaced apart approximately along the axial direction. Each flow channel may be oriented at a predetermined angle relative to an adjacent flow channel.

11 Claims, 8 Drawing Sheets

MULTI-CHANNEL VALVE FOR A DISHWASHING APPLIANCE

FIELD

The present subject matter relates generally to dishwashing appliances, and more particularly to a multi-channel valve for a dishwashing appliance.

BACKGROUND

Dishwashing appliances generally include a tub that defines a wash chamber. Rack assemblies can be mounted within the wash chamber of the tub for receipt of articles for washing. Wash substances, for example, various combinations of water, detergent, wash additives, etc., may be introduced into the tub during an operation cycle of the dishwashing appliance. Furthermore, dishwashing appliances generally include a dispenser for dispensing multiple wash substances into the wash chamber.

One drawback of such dispensers is that they typically mix the multiple wash substances or allow for opportunities where the multiple wash substances may be mixed. In some cases, the mixing of wash substances is undesirable as during dishwasher cycles specific wash substances, for instance, liquids such as detergent, need to be dispensed at specific times during the cycle.

Accordingly, an improved dishwashing appliance that is configured to dispense or direct multiple wash substances into the wash chamber without mixing the multiple wash substances is desired. More specifically, a multi-channel valve that is configured to direct multiple wash substances without mixing would be particularly beneficial.

BRIEF DESCRIPTION

Aspects and advantages of the invention will be set forth in part in the following description, or may be apparent from the description, or may be learned through practice of the invention.

In one exemplary embodiment, a dishwashing appliance is provided. The dishwashing appliance may include a wash chamber for receipt of articles for washing. The dishwashing appliance may also include a door for selectively opening and closing the wash chamber. The dishwashing appliance may further include a fluid reservoir for separately containing a plurality of fluids. The dishwasher appliance may also include a pump assembly for directing the plurality of fluids to flow from the fluid reservoir to the wash chamber. The dishwasher appliance may also include a multi-channel valve. The multi-channel valve may include a cylindrical housing that may include a plurality of inlets and a plurality of outlets. Each inlet may be in fluid communication with a discrete fluid of the plurality of fluids. Each outlet may be in fluid communication with the pump assembly. The dishwasher appliance may further include an inner cylinder positioned within the housing. The inner cylinder may define a central axis. The inner cylinder may include a plurality of flow channels extending perpendicular to the central axis. The plurality of flow channels each may be spaced apart along the central axis. Each flow channel may be oriented at a predetermined angle relative to an adjacent flow channel.

In another exemplary embodiment, a multi-channel valve for a dishwashing appliance is provided. The multi-channel valve may define an axial direction, a radial direction, and a circumferential direction. The multi-channel valve may include a cylindrical housing that may include a plurality of inlet nozzles and a plurality of outlet nozzles. The multi-channel valve may further include an inner cylinder positioned within the cylindrical housing. The inner cylinder may define a central axis approximately parallel to the axial direction. The inner cylinder may include a plurality of flow channels each extending through the inner cylinder approximately perpendicular to the central axis. The plurality of flow channels may be spaced apart approximately along the axial direction. Each flow channel may be oriented at a predetermined angle relative to an adjacent flow channel.

In yet another exemplary embodiment, a method for operating a dishwashing appliance is provided. The method may include a step of rotating, via an actuator, an inner cylinder of a multi-channel valve to a first position of a plurality of positions. In the first position a flow path may be formed between a first inlet nozzle and a first outlet nozzle of a housing that surrounds the inner cylinder. The method may further include a step of directing, via a pump of the dishwashing appliance, a discrete fluid contained within a fluid reservoir through the flow path into a wash chamber of the dishwashing appliance. The method may also include a step of rotating, via the actuator, the inner cylinder of the multi-channel valve to a second position of a plurality of positions. In the second position the flow path may be formed between a second inlet nozzle and a second outlet nozzle of the housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
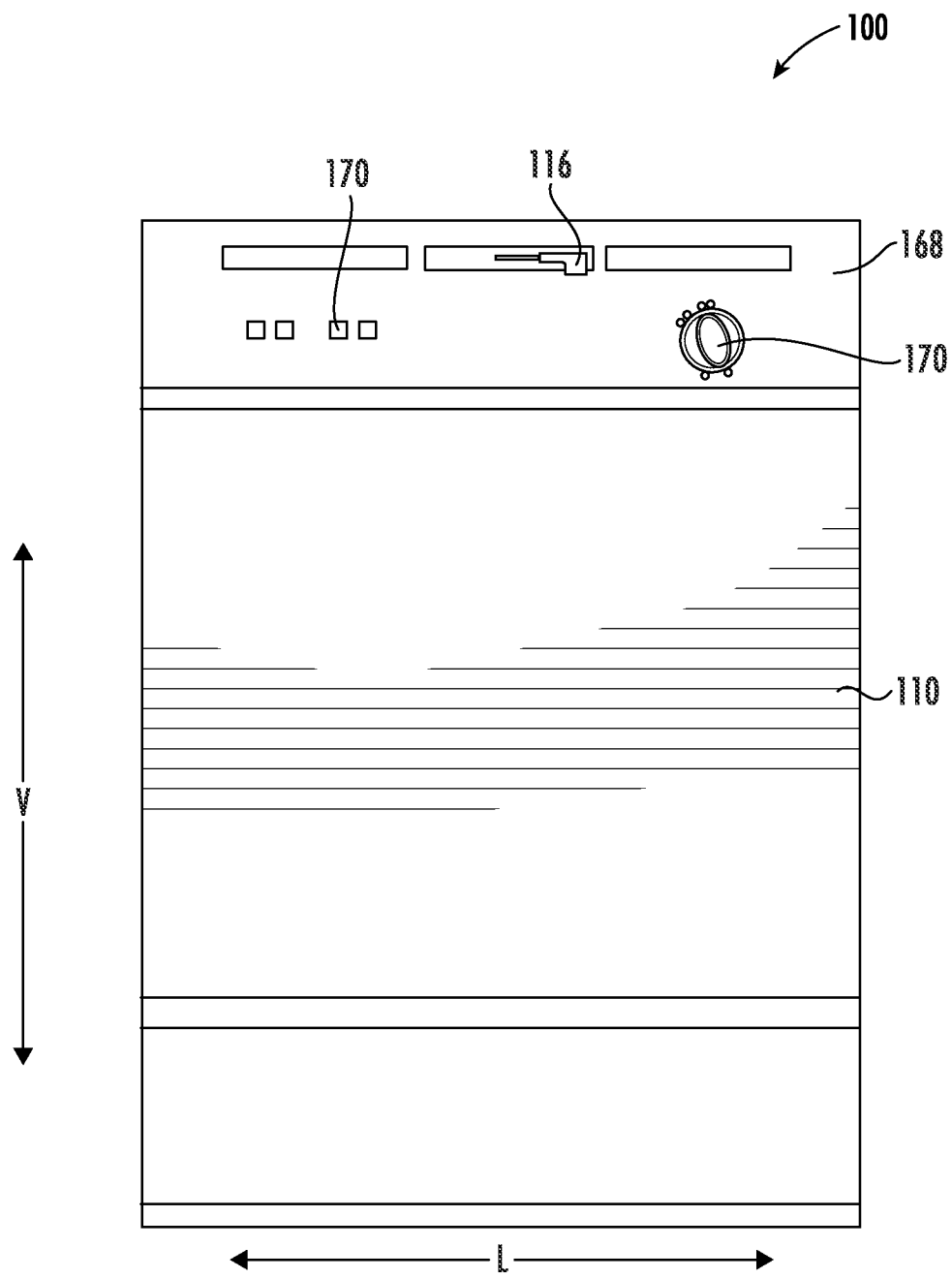
FIG. 1 provides a front view of a dishwashing appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise, or counterclockwise, with the vertical direction V.

Figure 2:
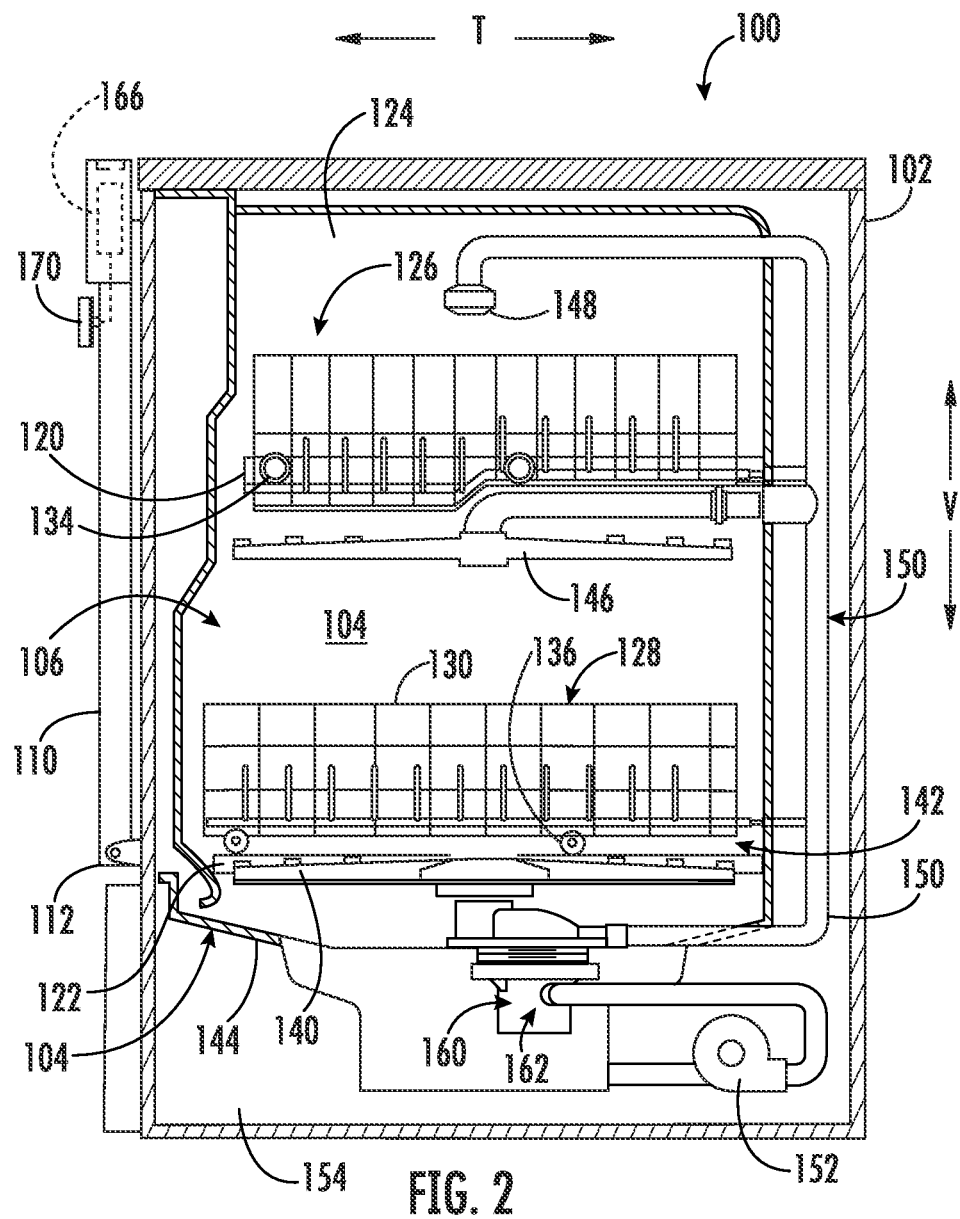
FIG. 2 provides a side, cross-sectional view of the dishwashing appliance of FIG. 1.

FIGS. 1 and 2 depict an exemplary domestic dishwashing appliance 100 that may be configured in accordance with aspects of the present disclosure. For the particular embodiment of FIGS. 1 and 2, the dishwashing appliance 100 includes a cabinet 102 having a tub or inner liner 104 therein that defines a wash chamber 106. As shown, tub 104 extends between a top and a bottom along a vertical direction V, between a first side and a second side along a lateral direction L, and between a front side and a rear side along a transverse direction T. Each of the vertical direction V, lateral direction L, and transverse direction T are mutually perpendicular to one another. The tub 104 includes a front opening (not shown) and a door 110 hinged at its bottom 112 for movement between a normally closed vertical position (shown in FIGS. 1 and 2), wherein the wash chamber 106 is sealed shut for washing operation, and a horizontal open position for loading and unloading of articles from the dishwashing appliance 100. Latch 116 is used to lock and unlock door 110 for access to wash chamber 106.

Upper and lower guide rails 120, 122 are mounted on tub side walls 124 and accommodate roller-equipped rack assemblies 126 and 128. Each of the rack assemblies 126, 128 is fabricated into lattice structures including a plurality of elongated members 130 (for clarity of illustration, not all elongated members making up assemblies 126 and 128 are shown in FIG. 2). Each rack 126, 128 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 134 and 136, for example, mounted onto racks 126 and 128, respectively. A silverware basket (not shown) may be removably attached to rack assembly 128 for placement of silverware, utensils, and the like, that are otherwise too small to be accommodated by the racks 126, 128. Alternatively, the silverware basket may be independently mounted within wash chamber 106. It should be appreciated that upper rack assembly 126, lower rack assembly 128, and the silverware basket may be any suitable size and configuration and may be mounted within dishwashing appliance 100 in any suitable manner.

The dishwashing appliance 100 further includes a lower spray-arm assembly 140 that is rotatably mounted within a lower region 142 of the wash chamber 106 and above a tub sump portion 144 so as to rotate in relatively close proximity to rack assembly 128. A mid-level spray-arm assembly 146 is located in an upper region of the wash chamber 106 and may be located in close proximity to upper rack 126. Additionally, an upper spray assembly 148 may be located above the upper rack 126.

The lower and mid-level spray-arm assemblies 140, 146 and the upper spray assembly 148 are part of a fluid circulation assembly 150 for circulating water and dishwasher fluid in the tub 104. The fluid circulation assembly 150 also includes a pump 152 positioned in a machinery compartment 154 located below the tub sump portion 144 (i.e., bottom wall) of the tub 104, as generally recognized in the art. Pump 152 receives wash fluid from sump 144 and provides a flow of wash fluid to a diverter 160. The flow of wash fluid enters diverter 160 through an inlet 162, and diverter 160 directs the flow of wash fluid to one or more spray assemblies throughout the dishwasher, e.g., to spray assemblies 140, 146, and 148, or to a silverware spray assembly.

Each spray-arm assembly 140, 146 includes an arrangement of discharge ports or orifices for directing washing liquid received from diverter 160 onto dishes or other articles located in rack assemblies 126 and 128. The arrangement of the discharge ports in spray-arm assemblies 140, 146 provides a rotational force by virtue of washing fluid flowing through the discharge ports. The resultant rotation of the spray-arm assemblies 140, 146 and the operation of spray assembly 148 using fluid from diverter 160 provides coverage of dishes and other dishwasher contents with a washing spray. Other configurations of spray assemblies may be used as well. For example, dishwashing appliance 100 may have additional spray assemblies for cleaning silverware, for scouring casserole dishes, for spraying pots and pans, for cleaning bottles, etc. One skilled in the art will appreciate that the embodiments discussed herein are used for the purpose of explanation only, and are not limitations of the present subject matter.

The dishwashing appliance 100 is further equipped with a controller 166 to regulate operation of the dishwashing appliance 100. The controller 166 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 166 may be positioned in a variety of locations throughout dishwashing appliance 100. In the illustrated embodiment, the controller 166 may be located within a control panel area 168 of door 110 as shown in FIGS. 1 and 2. In such an embodiment, input/output ("I/O") signals may be routed between the control system and various operational components of dishwashing appliance 100 along wiring harnesses that may be routed through the bottom 112 of door 110. Typically, the controller 166 includes a user interface panel/controls 170 through which a user may select various operational features and modes and monitor progress of the dishwashing appliance 100. In one embodiment, the user interface 170 may represent a general purpose I/O ("GPIO") device or functional block. In one embodiment, the user interface 170 may include input components, such as one or more of a variety of electrical, mechanical, or electro-mechanical input devices including rotary dials, push buttons, and touch pads. The user interface 170 may include a display component, such as a digital or analog display device designed to provide operational feedback to a user. The user interface 170 may be in communication with the controller 166 via one or more signal lines or shared communication busses.

It should be appreciated that the invention is not limited to any particular style, model, or configuration of dishwashing appliance 100. The exemplary embodiment depicted in FIGS. 1 and 2 is for illustrative purposes only. For example, different locations may be provided for user interface 170, different configurations may be provided for racks 126, 128, different spray arm assemblies 140, 146, 148 may be used, and other differences may be applied as well. Moreover, additional racks and/or spray assemblies in any suitable configuration may be included according to alternative embodiments.

Figure 3:
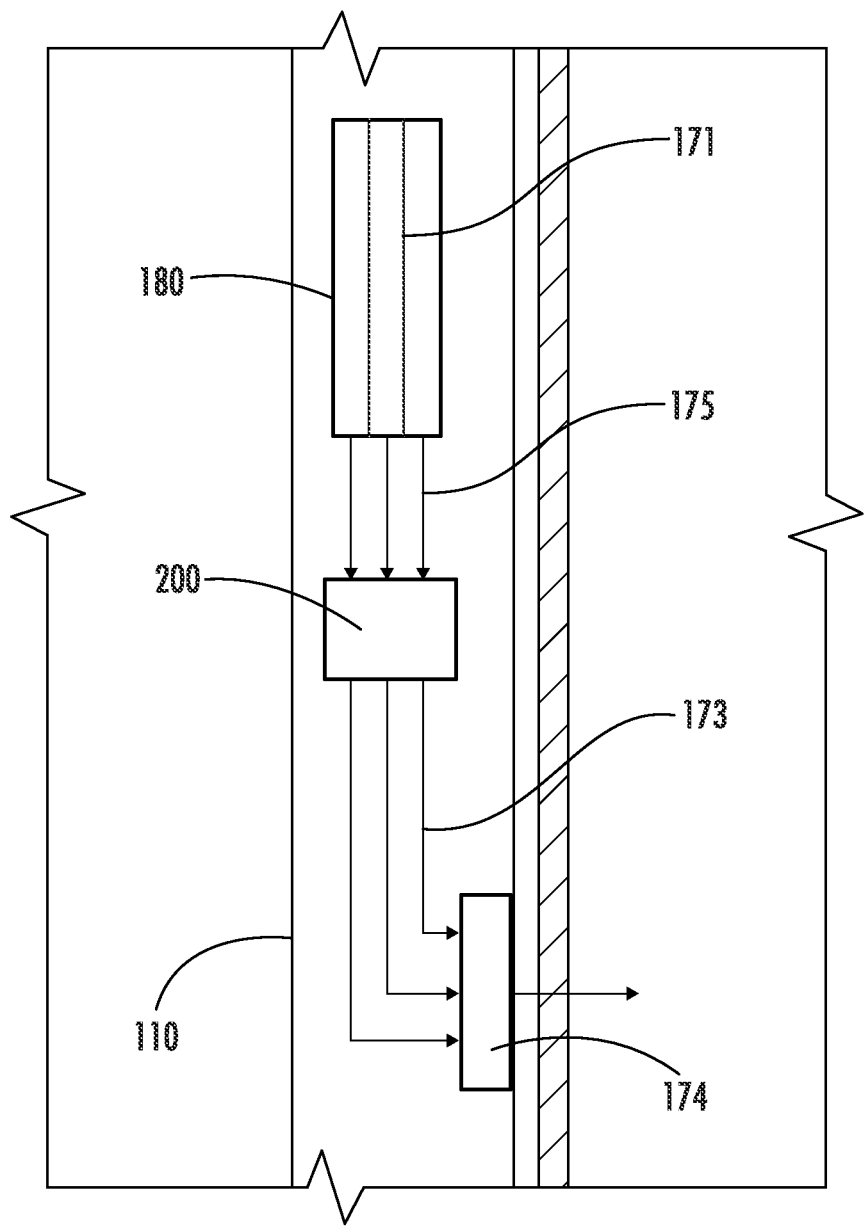
FIG. 3 provides a side, cross-sectional view of a portion a door of the dishwashing appliance of FIG. 1

Referring now to FIG. 3, a side, cross-sectional view of a portion of a door 110 of the dishwashing appliance 100 according to one or more exemplary aspects of the present subject matter is provided. In some embodiments, for example, as illustrated in FIG. 3 the dishwashing appliance 100 may further include a fluid reservoir 180 that may separately contain a plurality of fluids within. For instance, the fluid reservoir 180 may include partitions 171 which may subdivide the fluid reservoir 180 into separate mutually isolated chambers for separately containing different fluids of the plurality of fluids. For example, as illustrated in FIG. 3, the fluid reservoir 180 may include two partitions 171 that may subdivide the fluid reservoir 180 into three separate mutually isolated chambers that may each contain a different fluid such as dishwasher detergent, a rinse aid, or any other suitable wash substance within the fluid reservoir 180.

In some embodiments, for instance, as illustrated in FIG. 3, the dishwashing appliance 100 may also include a pump assembly 174 for directing or pumping the plurality of fluids 178 from the fluid reservoir 180 and into the wash chamber 106. Further, and as will be discussed in more detail herein, the dishwashing appliance 100 may include a multi-channel valve 200 for selectively aligning a flow channel of a plurality of flow channels to provide a flow path for a discrete fluid of the plurality of fluids to be pumped from the fluid reservoir 180 and into the wash chamber 106. In this regard, one fluid of the plurality of different fluids in the fluid reservoir 180 may be dispensed into the wash chamber 106 at a time.

In some embodiments, for instance, as depicted in FIG. 3, the pump assembly 174 may include a single pump. In such embodiments, each outlet of the multi-channel valve 200 may be in fluid communication with the single pump of the pump assembly 174. For instance, in some embodiments, each outlet of the multi-channel valve 200 may be coupled to a conduit 173, for example, a tube or pipe, that each may be fed to the single pump of the pump assembly 174. In this regard, the single pump of the pump assembly 174 may be provided to direct or pump a discrete fluid from the fluid reservoir 180. As will be described in more detail below, the fluid that may be directed or pumped to the wash chamber 106 may be based on a position of the multi-channel valve 200.

In alternative embodiments, the pump assembly 174 may include a plurality of pumps that each may be configured to direct or pump a discrete fluid of the plurality of fluids from the fluid reservoir 180. For instance, each pump of the plurality of pumps may be attached to a single outlet, and the operation of the pump may be controlled by the controller 156. In this regard, the fluid that may be directed or pumped to the wash chamber 106 may be based on the position of the multi-channel valve 200 and the operation of the pump attached to the corresponding outlet.

Additionally, in some embodiments, the pump assembly 174 may include a dispenser mechanism (not shown) that may be fluidly coupled to an outlet of the pump. In such embodiments, the dispenser mechanism may be an additional component that may be used to selectively dispense fluid into the wash chamber 106. For instance, the dispenser may be an additional component that may be provided to mechanically dispense the fluid directed or pumped via the pump assembly 174 to the wash chamber 106.

As illustrated in FIG. 3, the fluid reservoir 180, the multi-channel valve 200, and the pump assembly 174 may be positioned within the door 110. One of ordinary skill in the art would clearly recognize that the position and location of the fluid reservoir 180, the multi-channel valve 200, and the pump assembly 174 illustrated in FIG. 3 may be provided by way of example only. In alternative exemplary embodiments, the fluid reservoir 180, the multi-channel valve 200, and the pump assembly 174 may be positioned at any suitable location within the dishwashing appliance 100. For example, in some embodiments, the fluid reservoir 180, the multi-channel valve 200, and the pump assembly 174 may be positioned underneath the tub 104.

Figure 4:
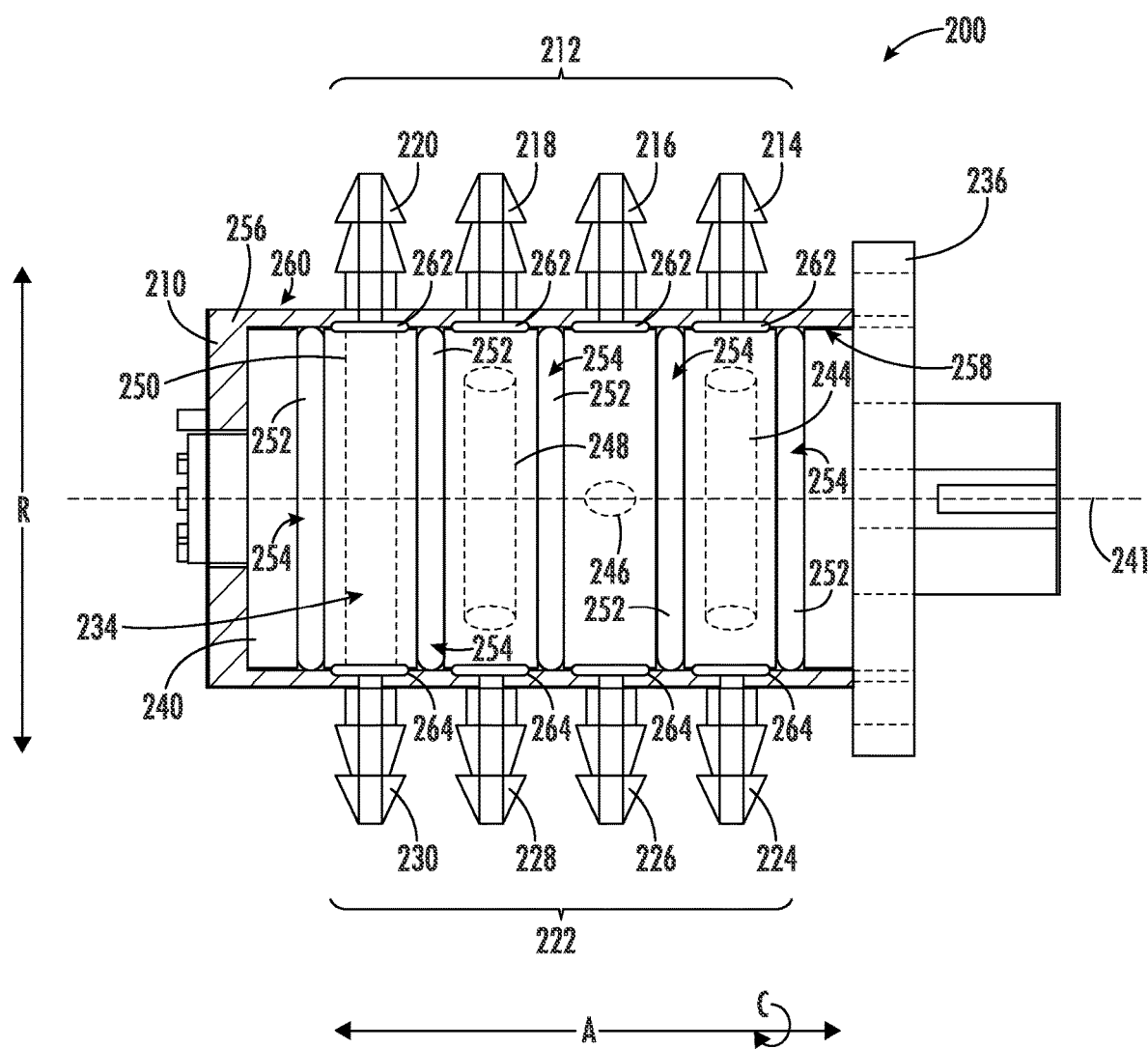
FIG. 4 provides a cross-sectional view of a multi-channel valve according to one or more exemplary embodiments of the present subject matter.

Referring now to FIG. 4, a cross-sectional view of the multi-channel valve 200 according to one or more exemplary embodiments of the present subject matter is provided. In some embodiments, the multi-channel valve 200 may define an axial direction A along or parallel to a central axis 241, a radial direction R perpendicular to the axial direction A, and a circumferential direction C extending around the axial direction A. In addition, the multi-channel valve 200 may generally include a cylindrical housing 210 and an inner cylinder 240 that may be positioned within the housing 210, such as the inner cylinder 240 may be approximately concentric with the cylindrical housing 210 when the inner cylinder 240 is positioned within the housing 210. In some embodiments, the housing 210 may include a plurality of inlet nozzles 212. Particularly, as illustrated in FIG. 4, the housing 210 may include a first inlet nozzle 214, a second inlet nozzle 216, a third inlet nozzle 218, and a fourth inlet nozzle 220. In some embodiments, the housing 210 may also include a plurality of outlet nozzles 222. Particularly, as illustrated in FIG. 4, the housing 210 includes a first outlet nozzle 224, a second outlet nozzle 226, a third outlet nozzle 228, and a fourth outlet nozzle 230.

In some embodiments, each inlet nozzle may have a corresponding outlet nozzle, wherein the inlet nozzle and the corresponding outlet nozzle may be on the same plane, wherein the plane may be approximately perpendicular to the central axis 241. For instance, as depicted in FIG. 4, the first inlet nozzle 214 may correspond to the first outlet nozzle 224 as the first inlet nozzle 214 and the first outlet nozzle 224 may be on the same plane, wherein the plane is approximately perpendicular to the central axis 241.

One of ordinary skill in the art would understand that the number of inlet nozzles 212 and the number of outlet nozzles 222 may be provided by way of example only. In alternative exemplary embodiments, the plurality of inlet nozzles 212 may include any suitable number of inlet nozzles and the plurality of outlet nozzles 222 may include any suitable number of outlet nozzles. For example, the plurality of inlet nozzles 212 may include only two inlet nozzles and the plurality of outlet nozzles 222 may include only two outlet nozzles. As another example, the plurality of inlet nozzles 212 may include four or more inlet nozzles, for instance, the plurality of inlet nozzles 212 may include five inlet nozzles, and the plurality of outlet nozzles 222 may include four or more outlet nozzles, for instance, the plurality of outlet nozzles 222 may include five outlet nozzles.

In some embodiments, the inner cylinder 240 may define the central axis 241 that may be approximately parallel to the axial direction A of the multi-channel valve 200. In some embodiments, the inner cylinder 240 may include a plurality of flow channels that each may be spaced apart approximately along the axial direction A. Particularly, as illustrated in FIG. 4, the inner cylinder 240 may include a first flow channel 244, a second flow channel 246, a third flow channel 248, and a fourth flow channel 250. Each flow channel of the plurality of flow channels, for example, the first flow channel 244, the second flow channel 246, the third flow channel 248, and the fourth flow channel 250, may be extended through the inner cylinder 240 approximately perpendicular to the central axis 241.

In some embodiments, each flow channel may correspond to one pair of nozzles, for example, each flow channel may correspond to one inlet nozzle and the one outlet nozzle that each may be on the same plane perpendicular to the central axis 241 such that a flow path may be created between the inlet nozzle and the outlet nozzle via the flow channel. For example, the first flow channel 244 may correspond to the first inlet nozzle 214 and the first outlet nozzle 224.

Figure 5:
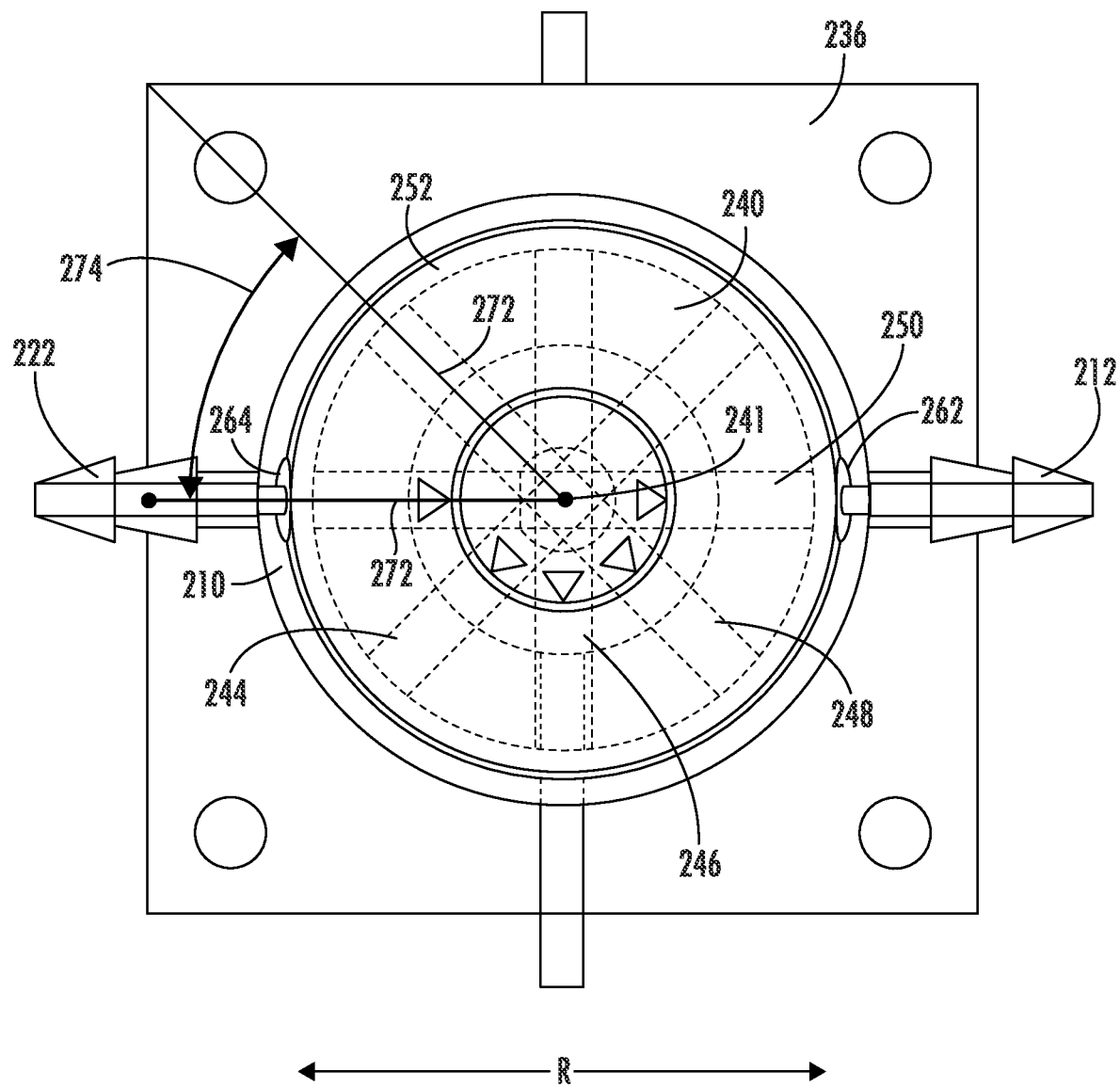
FIG. 5 provides an end view of the multi-channel valve according to one or more exemplary embodiments of the present subject matter.

In some embodiments, each flow channel of the plurality of flow channels may be oriented at a predetermined angle 274, see, for example, FIG. 5, relative to an adjacent flow channel. For example, the second flow channel 246 may be oriented at the predetermined angle 274 relative to the first flow channel 244, the third flow channel 248 may be oriented at the predetermined angle 274 relative the second flow channel 246, and the fourth flow channel 250 may be oriented at the predetermined angle 274 relative to the third flow channel 248.

Specifically, as illustrated in FIG. 5, the predetermined angle may be forty five degrees (45°) such that the second flow channel 246 may be oriented forty five degrees (45°) from the first flow channel 244, the third flow channel 248 may be oriented forty five degrees (45°) from the second flow channel 246 and ninety degrees (90°) from the first flow channel 244, and the fourth flow channel 250 may be oriented forty five degrees (45°) from the third flow channel 248, ninety degrees (90°) from the second flow channel 246, and one hundred and thirty five degrees (135°) from the first flow channel 244.

In some embodiments, one inlet nozzle may be in selective fluid communication with the corresponding outlet nozzle via one flow channel of the plurality of flow channels. For example, as shown in FIG. 4, the first inlet nozzle 214 may be in selective fluid communication with the corresponding first outlet nozzle 224 via the first flow channel 244; the second inlet nozzle 216 may be in selective fluid communication with the second outlet nozzle 226 via the second flow channel 246; the third inlet nozzle 218 may be in selective fluid communication with the third outlet nozzle 228 via the third flow channel 248; and the fourth inlet nozzle 220 may be in selective fluid communication with the fourth outlet nozzle 230 via the fourth flow channel 250.

In some embodiments, the multi-channel valve 200 may further include a plurality of housing seals 252 that may provide a seal for the plurality of flow channels. For instance, in some embodiments, the inner cylinder 240 may include a plurality of grooves 254 along a circumference of the inner cylinder 240. In some embodiments, a groove 254 may be positioned adjacent to a single flow channel approximately along the axial direction or may be positioned in between adjacent flow approximately along the axial direction. For example, a groove of the plurality of grooves 254 may be positioned adjacent to an axial side of the first flow channel 244 that is not adjacent to a flow channel, a groove of the plurality of grooves 254 may be positioned between the first flow channel 244 and the second flow channel 246, a groove of the plurality of grooves 254 may be positioned between second flow channel 246 and the third flow channel 248, a groove of the plurality of grooves 254 may be positioned between the third flow channel 248 and the fourth flow channel 250, and a groove of the plurality of grooves 254 may be positioned adjacent to the axial side of the fourth flow channel 250 that is not adjacent to a flow channel. Each groove 254 may be provided to accommodate one housing seal. In this regard, the plurality of flow channels may be sealed from one another.

In addition, in some embodiments, the housing 210 may include a cylindrical wall 256. The cylindrical wall 256 may include an inner surface 258 and an outer surface 260 positioned outward of the inner surface approximately along the radial direction R. In some embodiments, each inlet nozzle of the plurality of inlet nozzles 212 may be extended through the cylindrical wall 256 and each outlet nozzle of the plurality of outlet nozzles 222 may be extended through the cylindrical wall 256.

In some embodiments, the multi-channel valve 200 may include a plurality of inlet seals 262 and a plurality of outlet seals 264. Each inlet seal 262 may be positioned between the cylindrical wall 256 and the inner cylinder 240, and more particularly between the inner surface 258 of the cylindrical wall 256 and the inner cylinder 240. Each inlet seal 262 may correspond to one inlet nozzle of the plurality of inlet nozzles 212 and may be positioned to provide a seal for the corresponding inlet nozzle. In a similar manner, each outlet seal 264 may be positioned between the cylindrical wall 256 and the inner cylinder 240, and more particularly between the inner surface 258 of the cylindrical wall 256 and the inner cylinder 240. Each outlet seal 264 may correspond to one outlet nozzle of the plurality of outlet nozzles 222 and may be positioned to provide a seal for the corresponding inlet nozzle.

One of ordinary skill in the art would understand that the number of inlet nozzles, outlet nozzles, and flow channels as illustrated in FIG. 4 are provided by way of example only. In alternative exemplary embodiments, the multi-channel valve 200 may include any suitable equal number of inlet nozzles, outlet nozzles, and flow channels. In some embodiments, the multi-channel valve 200 may include two or more inlet nozzles, outlet nozzles, and flow channels. For example, in some embodiments, the multi-channel valve 200 may include only two inlet nozzles, outlet nozzles, and flow channels. As another example, in some embodiments, the multi-channel valve 200 may include five or more inlet nozzles, outlets nozzles, and flow channels. For instance, the multi-channel valve may include six inlet nozzles, outlet nozzles, and flow channels.

In some embodiments, such as when the multi-channel valve 200 is incorporated into dishwashing appliance 100, each inlet nozzle of the plurality of inlet nozzles 212 may be in fluid communication with a discrete fluid of the plurality of fluids contained within the fluid reservoir 180. For instance, in some embodiments, a conduit, such as conduit 175, may be used to fluidly connect each inlet nozzle to a discrete fluid contained within the fluid reservoir. In addition, in some embodiments, each outlet nozzle 222 may be in fluid communication with the pump assembly 174. For instance, in some embodiments, a conduit, such as conduit 173 may be used to fluidly connect each outlet nozzle to the pump assembly 174.

In addition, the inner cylinder 240 may be rotatable about the central axis 241 between a plurality of positions. In each position one flow channel may be selectively aligned with the corresponding inlet and the corresponding outlet to provide a flow path 234. For example, as illustrated in FIG. 4, the fourth flow channel 250 may be selectively aligned approximately along the radial direction R with the fourth inlet nozzle 220 and the fourth outlet nozzle 230 to provide the flow path 234. In addition, in each position the remaining flow channels of the plurality of flow channels are blocked to inhibit fluid communication between the corresponding inlet nozzles and the corresponding outlet nozzles. For example, as illustrated in FIG. 4, the first flow channel 244, the second flow channel 246, and the third flow channel 248 are blocked to inhibit fluid communication between the corresponding inlet nozzles and outlet nozzles.

Referring now to FIG. 5, an end view of the multi-channel valve 200 according to one or more exemplary embodiments of the present subject matter is provided. In some embodiments, the predetermined angle 274 of flow channel relative to the adjacent flow channel may be based at least on a number of flow channels of the plurality of flow channels. For example, based on the number of flow channels, the predetermined angle 274 may define the orientation of the flow channels relative to one another such that in each position only one flow path may be selectively aligned with the corresponding inlet nozzle and the corresponding outlet nozzle to provide the flow path 234. For instance, as illustrated in FIG. 5, the predetermined angle 274 of a flow channel relative to the adjacent flow channel may be approximately forty-five degrees. In various embodiments, the predetermined angle 274 may be an oblique angle, e.g., any angle other than parallel or perpendicular. For example, in some embodiments, the predetermined angle may be any suitable angle greater than zero degrees and less than ninety degrees, such as between about ten degrees and about eighty degrees, or between about twenty degrees and about seventy degrees, or between about thirty degrees and about sixty degrees, or between about forty degrees and about fifty degrees.

Figure 6:
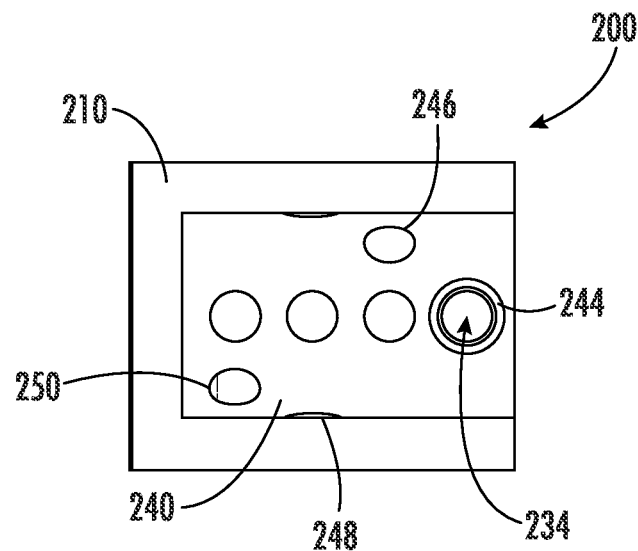
FIG. 6 provides a cross-sectional view of a simplified multi-channel valve according to one or more exemplary embodiments of the present subject matter.

Referring now to FIGS. 5 and 6, simplified cross-sectional views of the multi-channel valve 200 according to one or more exemplary embodiments of the present subject matter are provided. For instance, the plurality of inlet nozzles 212 and the plurality of outlet nozzles 222 have been removed for the sake of clarity only.

As mentioned above, the inner cylinder 240 may be rotatable between a plurality of positions. In each position one flow channel of the plurality of flow channels may be selectively aligned with one inlet nozzle and one outlet nozzle to provide a flow path and each of the remaining flow channels of the plurality of flow channels may be blocked. For example, as illustrated in FIG. 6, the inner cylinder 240 may be rotated such that the first flow channel 244 may be aligned with the first inlet nozzle 214 and the first outlet nozzle 224 such that the flow path 234 is formed between the first inlet nozzle 214 and the first outlet nozzle 224. Additionally, the second flow channel 246, the third flow channel 248, and the fourth flow channel 250 may be blocked such that fluid communication between the corresponding inlet nozzle and the corresponding outlet nozzle is inhibited.

Figure 7:
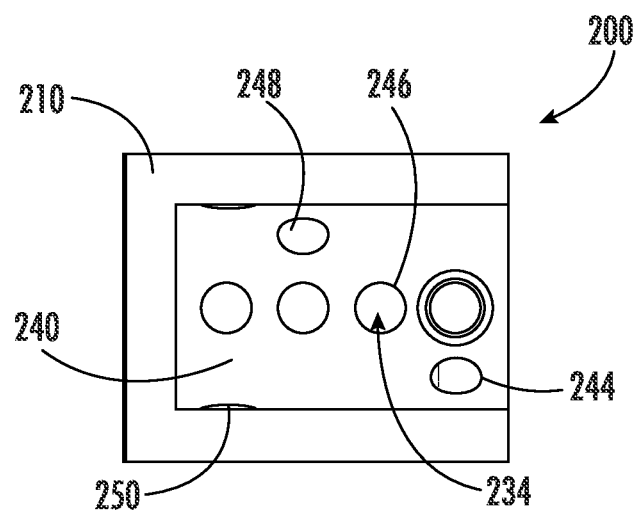
FIG. 7 provides an additional cross-sectional view of the simplified multi-channel valve according to one or more exemplary embodiments of the present subject matter.

As another example, as illustrated in FIG. 7, the inner cylinder 240 may be rotated such that the second flow channel 246 may be aligned with the second inlet nozzle 216 and the second outlet nozzle 226 and the flow path 234 is formed between the second inlet nozzle 216 and the second outlet nozzle 226. Additionally, the first flow channel 244, the third flow channel 248, and the fourth flow channel 250 may be blocked such that fluid communication between the corresponding inlet nozzle and the corresponding outlet nozzle is inhibited. In this regard, in each position only one fluid from the plurality of fluids contained in the fluid reservoir 180 may be directed from the fluid reservoir 180 into the flow path 234 and to the wash chamber 106.

Figure 8:
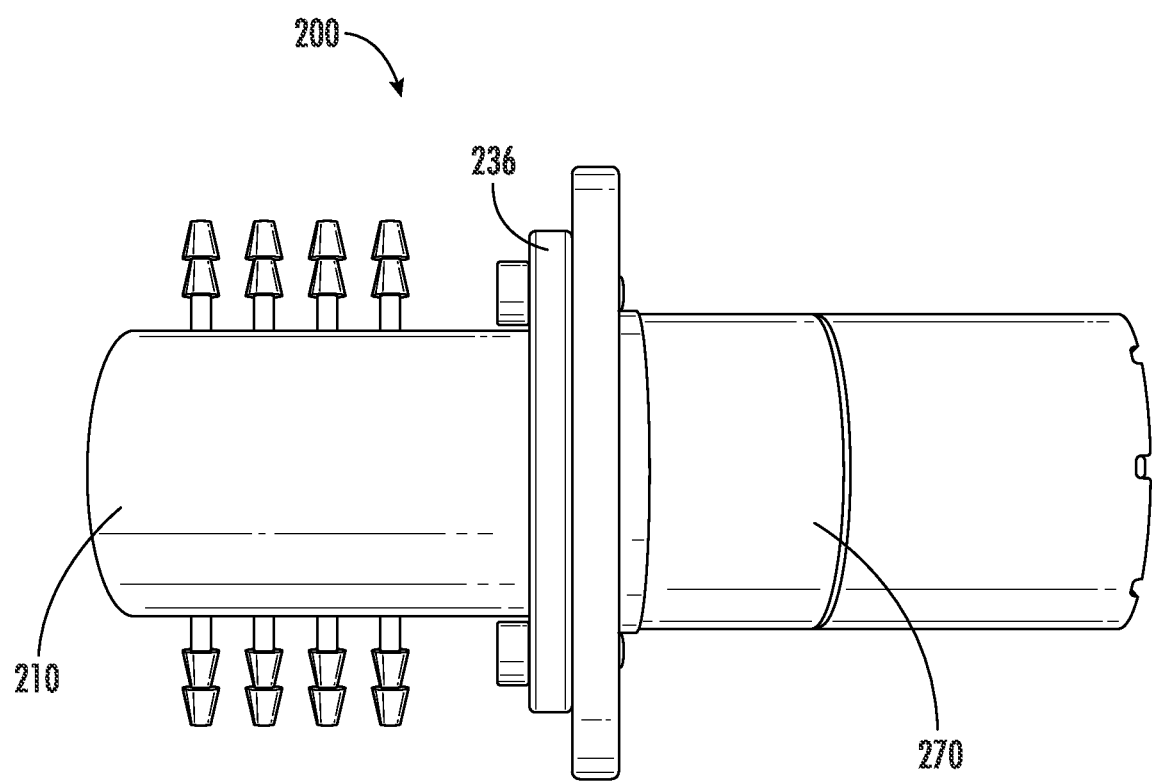
FIG. 8 provides a perspective view of a multi-channel valve according to one or more exemplary embodiments of the present subject matter.

Referring now to FIG. 8, a perspective of the multi-channel valve 200 according to one or more exemplary embodiments of the present subject matter is provided. In some embodiments, the multi-channel valve 200 may further include an actuator 270 that may be provided to drive rotation of the inner cylinder 240 about the central axis 241 within the housing 210. For instance, the actuator 270 may be mechanically coupled to the inner cylinder 240 and held in place by being attached to a base 236 of the multi-channel valve 200. In some embodiments, the actuator 270 may be any suitable actuating mechanism. For instance, the actuator 270 may be a motor, hand crack, or any other suitable actuating mechanism that may be capable for driving rotation of the inner cylinder 240 within the housing 210.

Figure 9:
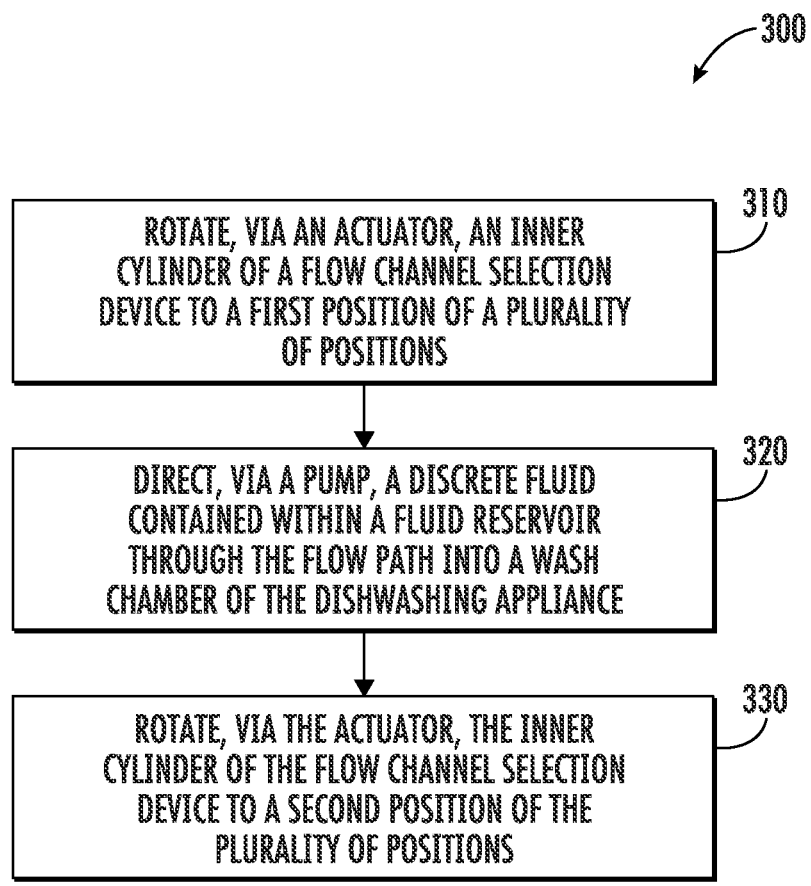
FIG. 9 provides a flow chart illustrating an exemplary method of operating a dishwashing appliance according to one or more exemplary embodiments of the present subject matter.

Referring now to FIG. 9, embodiments of the present subject matter may include one or more methods for operating a dishwashing appliance, such as the exemplary dishwashing appliance 100 described above, as well as other possible exemplary dishwashing appliances. The exemplary methods according to the present subject matter may include a method 300, for example, as illustrated in FIG. 9. A controller of the dishwashing appliance 100, such as the controller 156 of the exemplary dishwashing appliance 100, may be programmed to implement method 300, for example, the controller, such as controller 156, may be capable of and may be operable to perform any methods and associated method steps as disclosed herein.

In some embodiments, the method 300 may include a step 310 of rotating, via an actuator, an inner cylinder of a multi-channel valve to a first position of a plurality of positions. In the first position a flow path is formed between a first inlet nozzle and a first outlet nozzle of a housing that surrounds the inner cylinder. As described above, each flow channel may correspond to an inlet nozzle and an outlet nozzle. In this regard, at step 310 the flow path formed may allow a pump of the dishwashing appliance to direct a discrete fluid from a fluid reservoir. For instance, in some embodiments, the method 300 may also include a step 320 of directing, via a pump, the discrete fluid contained within the fluid reservoir through the flow path into a wash chamber of the dishwashing appliance. In some embodiments, a dispenser may be attached to the pump to mechanically dispense the fluid directed by the pump to the wash chamber.

In addition, in some embodiments, the method 300 may further include a step 330 of rotating, via the actuator, the inner cylinder of the multi-channel valve to a second position of the plurality of positions, wherein in the second position, the flow path is formed between a second inlet nozzle and a second outlet nozzle of the housing. In this regard, a different discrete fluid may be directed to the wash chamber. For instance, in some embodiments, the method 300 may also include a step of directing, via the pump of the dishwashing appliance, a different discrete fluid contained within the fluid reservoir through the flow path formed between the second inlet nozzle and the second outlet nozzle.

Embodiments of the present subject matter describe a multi-channel valve for dishwashing appliances that may advantageously direct multiple different fluids from a fluid reservoir into a wash chamber of the dishwashing appliance without mixing the different fluids. As described above, the multi-channel valve may advantageously include a rotatable inner cylinder positioned within a cylindrical housing and an actuator, for instance, a motor or a hand crank, that is provided to drive rotation of the inner cylinder to selectively align different flow channels to provide a flow path between the fluid reservoir and the pump and to block flow channels that are not in use. In this regard, only the flow channel that is not blocked may provide a flow path. The multiple flow channels that may form the flow path may allow multiple fluids to be moved by a pump assembly without mixing. Additionally, in some embodiments, all the outlets may advantageously be combined into one outlet line and driven by a single pump of the pump assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance comprising:
   a wash chamber for receipt of articles for washing;
   a door for selectively opening and closing the wash chamber of the dishwashing appliance;
   a fluid reservoir for separately containing a plurality of fluids;
   a pump assembly for directing the plurality of fluids to flow from the fluid reservoir to the wash chamber;
   a multi-channel valve comprising:
   a cylindrical housing comprising a plurality of inlets and a plurality of outlets, each inlet in fluid communication with a discrete fluid of the plurality of fluids and each outlet in fluid communication with the pump assembly; and
   an inner cylinder positioned within the housing, the inner cylinder comprising a central axis, and the inner cylinder comprising a plurality of flow channels, wherein each of the flow channels comprises a longitudinal axis extending perpendicular to the central axis, wherein the plurality of flow channels are spaced apart along the central axis, wherein each flow channel is oriented at a predetermined angle relative to an adjacent flow channel, wherein each of the flow channels is capable of forming a flow path with an inlet of the plurality of inlets and an outlet of the plurality of outlets, wherein the inner cylinder is rotatable about the central axis between a plurality of positions, and wherein in each of the positions one of the flow channels is aligned with a respective inlet and a respective outlet such that fluid can flow through a flow path formed by the one aligned flow channel and its respective inlet and its respective outlet while every other flow channel is blocked with respect to every inlet of the plurality of inlets and every outlet of the plurality of outlets.

2. The dishwashing appliance of claim 1, wherein during operation, based on positioning of the inner cylinder within the housing, a discrete fluid is directed by the pump assembly from the fluid reservoir to the wash chamber.

3. The dishwashing appliance of claim 1, wherein the multi-channel valve further comprises a motor coupled to the inner cylinder, wherein the motor is provided to drive rotation of the inner cylinder about the central axis.

4. The dishwashing appliance of claim 1, wherein the multi-channel valve further comprises a plurality of housing seals, wherein the inner cylinder comprises a plurality of grooves along a circumference of the inner cylinder, and wherein each groove of the inner cylinder is provided to accommodate one housing seal of the plurality of housing seals.

5. The dishwashing appliance of claim 1, wherein the housing comprises a cylindrical wall, wherein each inlet is extended through the cylindrical wall, and wherein each outlet is extended through the cylindrical wall.

6. The dishwashing appliance of claim 5, wherein the multi-channel valve comprises a plurality of inlet seals and a plurality of outlet seals, wherein each inlet seal is positioned between the cylindrical wall and the inner cylinder to seal an inlet of the plurality of inlets, and wherein each outlet seal is positioned between the cylindrical wall and the inner cylinder to seal an outlet of the plurality of outlets.

7. The dishwashing appliance of claim 1, wherein the predetermined angle is based at least on a number of flow channels of the plurality of flow channels.

8. The dishwashing appliance of claim 1, wherein the pump assembly comprises a plurality of pumps, wherein each pump of the plurality of pumps is in fluid communication with one outlet of the plurality of outlets, and wherein each pump is provided for directing one discrete fluid of the plurality of fluids from the fluid reservoir to the wash chamber.

9. The dishwashing appliance of claim 1, wherein the pump assembly comprises a single pump, wherein each outlet of the plurality of outlets is in fluid communication with the single pump.

10. A method for operating a dishwashing appliance, the method comprising:

providing a dishwashing appliance,
wherein the dishwashing appliance comprises a wash chamber for receipt of articles for washing, wherein the dishwashing appliance comprises a door for selectively opening and closing the wash chamber, wherein the dishwashing appliance comprises a fluid reservoir for separately containing a plurality of fluids, wherein the dishwashing appliance comprises a pump assembly for directing the plurality of fluids to flow from the fluid reservoir to the wash chamber, and wherein the dishwashing appliance comprises a multi-channel valve comprising a cylindrical housing and an inner cylinder positioned within the cylindrical housing,
wherein the cylindrical housing comprises a plurality of inlets and a plurality of outlets, each inlet in fluid communication with a discrete fluid of the plurality of fluids and each outlet in fluid communication with the pump assembly, and
wherein the inner cylinder comprises a central axis and a plurality of flow channels, wherein each of the flow channels comprises a longitudinal axis extending perpendicular to the central axis, wherein the plurality of flow channels are spaced apart along the central axis, wherein each flow channel is oriented at a predetermined angle relative to an adjacent flow channel, where each of the flow channels is capable of forming a flow path with an inlet of the plurality of inlets and an outlet of the plurality of outlets, wherein the inner cylinder is rotatable about the central axis between a plurality of positions, wherein in each of the positions one of the flow channels is aligned with a respective inlet and a respective outlet such that fluid can flow through a flow path formed by the one aligned flow channel and its respective inlet and its respective outlet while every other flow channel is blocked with respect to every inlet of the plurality of inlets and every outlet is of the plurality of outlets;
rotating, via a motor, the inner cylinder to a first position of the plurality of positions, whereby a first flow path is formed between a first inlet nozzle and a first outlet nozzle of the cylindrical housing;
directing, via the pump assembly, a discrete fluid contained within the fluid reservoir through the first flow path into the wash chamber of the dishwashing appliance; and
rotating, via the motor, the inner cylinder of the multi channel valve to a second position of the plurality of positions, whereby the first flow path between the first inlet nozzle and the first outlet nozzle is obstructed and a second flow path is formed between a second inlet nozzle and a second outlet nozzle of the cylindrical housing.

11. The method of claim 10, further comprising directing, via the pump assembly of the dishwashing appliance, a different discrete fluid contained within the fluid reservoir through the second flow path formed between the second inlet nozzle and the second outlet nozzle into the wash chamber.

* * * * *